United States Patent
Istvan et al.

(10) Patent No.: US 7,080,394 B2
(45) Date of Patent: Jul. 18, 2006

(54) SYSTEM AND METHOD FOR CAPTURING VIDEO FRAMES FOR FOCUSED NAVIGATION WITHIN A USER INTERFACE

(75) Inventors: Anthony F. Istvan, Snoqualmie, WA (US); James A. Billmaier, Woodinville, WA (US); John M. Kellum, Seattle, WA (US); Dewey Reid, San Rafael, CA (US); Philip Rogan, Bozeman, MT (US)

(73) Assignee: Digeo, Inc., Kirkland, WA (US)

( * ) Notice: Subject to any disclaimer, the term of this patent is extended or adjusted under 35 U.S.C. 154(b) by 78 days.

(21) Appl. No.: 10/230,964

(22) Filed: Aug. 29, 2002

(65) Prior Publication Data
US 2003/0074662 A1   Apr. 17, 2003

Related U.S. Application Data

(63) Continuation-in-part of application No. 10/097,174, filed on Mar. 12, 2002.

(60) Provisional application No. 60/324,997, filed on Sep. 26, 2001, provisional application No. 60/317,612, filed on Sep. 6, 2001, provisional application No. 60/315,731, filed on Aug. 29, 2001.

(51) Int. Cl.
*H04N 5/445* (2006.01)

(52) U.S. Cl. ............................. 725/43; 725/41; 725/56; 725/57; 725/59; 725/93; 725/139

(58) Field of Classification Search .................. 725/37, 725/56, 57, 59, 93, 136, 139, 41, 43, 39, 725/44, 45, 46, 47, 97; 345/723; 384/553; 348/553; 715/723
See application file for complete search history.

(56) References Cited

U.S. PATENT DOCUMENTS

| 5,398,074 A | 3/1995 | Duffield et al. ............. 348/564 |
| 5,524,195 A | 6/1996 | Clanton, III et al. ....... 395/155 |
| 5,602,596 A | 2/1997 | Claussen et al. ............ 348/564 |
| 5,606,374 A | 2/1997 | Bertram ...................... 348/565 |
| 5,621,456 A | 4/1997 | Florin et al. ................... 348/7 |
| 5,623,613 A | 4/1997 | Rowe et al. ................. 395/353 |
| 5,663,757 A | 9/1997 | Morales ....................... 348/13 |
| 5,673,401 A * | 9/1997 | Volk et al. ................... 725/139 |
| 5,677,708 A | 10/1997 | Matthews, III et al. ..... 345/115 |
| 5,682,511 A | 10/1997 | Sposato et al. ............. 395/353 |

(Continued)

FOREIGN PATENT DOCUMENTS

EP  1 028 570 A1   8/2000

OTHER PUBLICATIONS

U.S. Appl. No. 10/260,738, filed Sep. 30, 2002, Billmaier et al.

(Continued)

*Primary Examiner*—Kieu-Oanh Bui
(74) *Attorney, Agent, or Firm*—Kory D. Christensen; Stoel Rives LLP

(57) ABSTRACT

A video frame is captured from a television broadcast on each of a plurality of channels. The captured video frames are provided to a display interface, which successively displays the captured video frames within a focus area of a user interface in response to an initiating action by a user. The display interface then discontinues the successive display of video frames to show a particular video frame corresponding to a selected channel in response to a terminating action by the user.

52 Claims, 14 Drawing Sheets

U.S. PATENT DOCUMENTS

| | | | |
|---|---|---|---|
| 5,812,124 | A | 9/1998 | Eick et al. .................. 345/327 |
| 5,838,326 | A | 11/1998 | Card et al. .................. 345/355 |
| 5,850,218 | A | 12/1998 | LaJoie et al. ............... 345/327 |
| 6,005,601 | A | 12/1999 | Ohkura et al. ................. 348/7 |
| 6,020,930 | A | 2/2000 | Legrand ..................... 348/569 |
| 6,028,600 | A | 2/2000 | Rosin et al. ................ 345/327 |
| 6,037,933 | A | 3/2000 | Blonstein et al. ........... 345/327 |
| 6,046,722 | A | 4/2000 | McKiel, Jr. .................. 345/145 |
| 6,151,059 | A | 11/2000 | Schein et al. .................. 348/13 |
| 6,163,345 | A | 12/2000 | Noguchi et al. ............ 348/564 |
| 6,175,362 | B1 | 1/2001 | Harms et al. ............... 345/327 |
| 6,188,406 | B1 | 2/2001 | Fong et al. .................. 345/348 |
| 6,262,722 | B1 | 7/2001 | Allison et al. ............... 345/327 |
| 6,266,059 | B1* | 7/2001 | Matthews et al. .......... 715/810 |
| 6,266,098 | B1 | 7/2001 | Cove et al. .................. 348/563 |
| 6,281,940 | B1 | 8/2001 | Sciammarella .............. 348/564 |
| 6,295,062 | B1 | 9/2001 | Tada et al. ................... 345/348 |
| 6,313,851 | B1* | 11/2001 | Matthews et al. .......... 715/718 |
| 6,344,880 | B1 | 2/2002 | Takahashi et al. .......... 348/563 |
| 6,425,129 | B1 | 7/2002 | Sciammarella et al. ....... 715/38 |
| 6,538,672 | B1 | 3/2003 | Dobbelaar .................. 345/810 |
| 6,577,350 | B1 | 6/2003 | Proehl et al. ............... 348/564 |
| 6,613,100 | B1 | 9/2003 | Miller ......................... 715/526 |
| 6,642,939 | B1 | 11/2003 | Vallone et al. .............. 345/721 |
| 6,678,891 | B1 | 1/2004 | Wilcox et al. ................. 725/42 |
| 6,690,391 | B1 | 2/2004 | Proehl et al. ............... 345/720 |
| 6,728,675 | B1 | 4/2004 | Maddalozzo, Jr. et al. . 704/258 |
| 6,934,917 | B1 | 8/2005 | Lin ............................. 715/811 |
| 2002/0033848 | A1 | 3/2002 | Sciammarella et al. ..... 345/838 |
| 2002/0056129 | A1 | 5/2002 | Blackketter et al. ........ 725/112 |
| 2002/0070958 | A1* | 6/2002 | Yeo et al. .................... 345/723 |
| 2002/0078440 | A1* | 6/2002 | Feinberg et al. ................ 725/9 |
| 2002/0152474 | A1 | 10/2002 | Dudkiewicz ................ 725/136 |
| 2003/0001898 | A1 | 1/2003 | Bernhardson .............. 345/786 |
| 2003/0052900 | A1 | 3/2003 | Card et al. .................. 345/660 |
| 2003/0090524 | A1 | 5/2003 | Segerberg et al. .......... 345/786 |
| 2003/0093792 | A1 | 5/2003 | Labeeb et al. ................ 725/46 |

OTHER PUBLICATIONS

U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/097,195, filed Mar. 12, 2002, Billmaier et al.
U.S. Appl. No. 10/108,178, filed Mar. 27, 2002, Billmaier et al.
U.S. Appl. No. 10/113,889, filed Mar. 29, 2002, Billmaier et al.
U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/260,700, filed Sep. 30, 2002, Billmaier et al.
U.S. Appl. No. 10/270,738, filed Sep. 30, 2002, Billmaier et al.
U.S. Appl. No. 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2002, Billmaier et al.
U.S. Appl. No. 10/183,804, filed May 3, 2002, Billmaier et al.
U.S. Appl. No. 60/317,612, filed Sep. 6, 2001, Reid et al.
U.S. Appl. No. 60/324,997, filed Sep. 26, 2001, Reid et al.
U.S. Appl. No. 10/186,094, filed Jun. 29, 2002, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/161,708, filed Jun. 3, 2002, Nguyen et al.
U.S. Appl. No. 10/251,366, filed Sep. 20, 2002, Allen et al.
U.S. Appl. No. 10/260,881, filed Sep. 30, 2002, Allen et al.
U.S. Appl. No. 10/320,900, filed Dec. 16, 2002, Kolde et al.
U.S. Appl. No. 10/328,514, filed Dec. 23, 2002, Kolde et al.

* cited by examiner

SYSTEM AND METHOD FOR CAPTURING VIDEO FRAMES FOR FOCUSED NAVIGATION WITHIN A USER INTERFACE

RELATED APPLICATIONS

This application is a continuation-in-part of U.S. patent application Ser. No. 10/097,174, filed Mar. 12, 2002, for "System and Method for Focused Navigation within an Interactive Television User Interface." The present application is also related to and claims the benefit of U.S. Provisional Application No. 60/315,731, filed Aug. 29, 2001, entitled "System and Method for Visual Channel Surfing", which is hereby incorporated by reference in its entirety. The present application is further related to and claims the benefit of U.S. Provisional Application No. 60/317,612, filed Sep. 6, 2001, entitled "System and Method for Visual Channel Surfing", which is hereby incorporated by reference in its entirety. The present application is also related to and claims the benefit of U.S. Provisional Application No. 60/324,997, filed Sep. 26, 2001, entitled "System and Method for Visual Channel Surfing Using Center-Focused Navigation", which is hereby incorporated by reference in its entirety.

BACKGROUND

1. Field of the Invention

The present invention relates generally to the field of graphical user interfaces. More specifically, the present invention relates to a system and method for capturing video frames for focused navigation within a graphical user interface.

2. Description of Related Background Art

Recent advances in technology have vastly increased the number of available options within personal computers (PCs), interactive television (ITV) systems, personal digital assistant (PDAs), cellular telephones, and other information systems. For instance, current ITV systems offer hundreds of broadcast channels and a variety of interactive options, including e-mail, videoconferencing, instant messaging, online banking, online purchasing, and so forth.

Unfortunately, despite technological advances, user interfaces for these systems have remained largely unchanged, making navigation through all of the newly available options no easy task. For example, a user of a modern ITV system must scan through potentially hundreds of channels and other options, often by repeatedly pressing a button on a remote control. Such an outdated approach is far too slow and inconvenient to facilitate effective operation of a modern ITV system.

Similar problems exist with PC interfaces. The graphical user interface (GUI) of a modern PC looks remarkably similar to the first GUI developed twenty years ago. Small icons representing user options are arranged in rows and columns on a graphical representation of a desktop. Many of the icons are identical, requiring the addition of text labels as a distinguishing feature. Typically, a user must individually examine each icon and read each label—a time-consuming process that does not lend itself to effective navigation of the numerous options available in a modern PC.

Accordingly, it would be an advancement in the art to provide a user interface that allows for rapid and efficient navigation of a plurality of options without the drawbacks of conventional approaches. In particular, it would be an advancement in the art to provide an interface in which a user need not repeatedly press a button to display each available option, as is often the case with conventional TV or ITV interfaces. Likewise, it would be an advancement in the art to provide an interface in which a user need not scan through an arrangement of multiple icons, as is the case in many conventional PC interfaces.

BRIEF DESCRIPTION OF THE DRAWINGS

Non-exhaustive embodiments of the invention are described with reference to the figures, in which.

DETAILED DESCRIPTION

Figure 1:
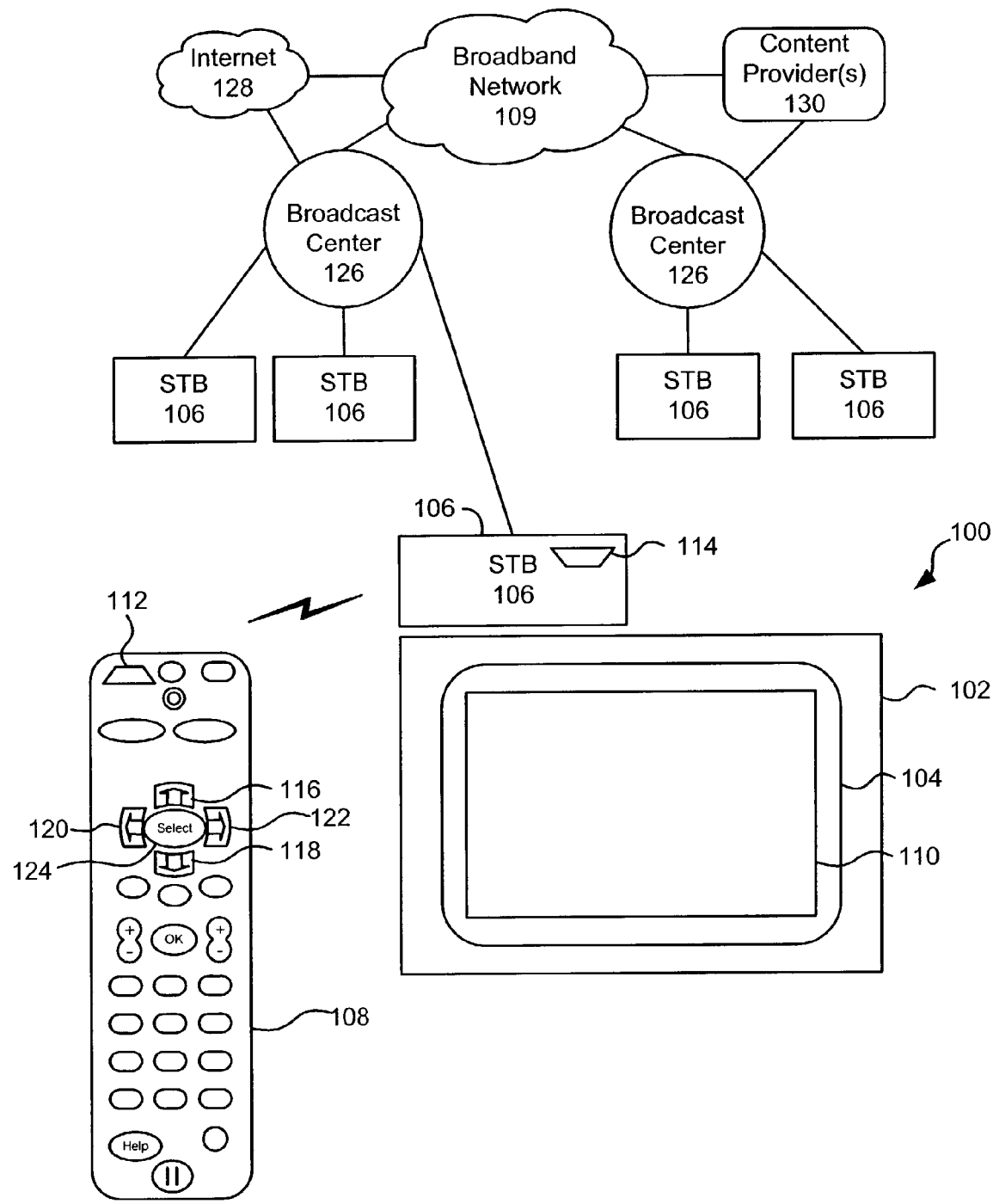
FIG. 1 is a block diagram of an ITV system in conjunction with a broadband network.

Reference is now made to the figures in which like reference numerals refer to like or similar elements. The first digit or digits of each reference numeral indicates the figure in which the corresponding element or step was introduced.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details, such as examples of programming, software modules, user selections, network transactions, database queries, database structures, etc., are provided for a thorough understanding of the embodiments of the invention. Those skilled in the art will recognize, however, that the invention can be practiced without one or more of the specific details, or with other methods, components, materials, etc. In other instances, well-known structures, materials, or operations are not shown or not described in detail to avoid obscuring aspects of the invention.

While the following description makes particular reference to ITV systems, it should be recognized that the present invention may be used in conjunction with any type of information/entertainment system in which selectable options may be displayed on a display screen. Examples of such systems include, but are not limited to, ITV systems, personal computers, and mobile computing devices, such as PDAs, webpads, cellular telephones, and the like.

Referring now to FIG. 1, a block diagram of an ITV system 100 is shown according to an embodiment of the invention. In one configuration, the ITV system 100 includes a television (TV) 102 or other device having a display screen 104, a set-top box (STB) 106, and a remote control 108.

The STB 106 serves as a gateway between the TV 102 and a broadband network 109, such as a cable television network or a direct broadcast satellite (DBS) network. One commercially-available example of an STB 106 is the Motorola DCT5000® interactive set-top terminal.

The STB 106 receives encoded television signals and other data from the broadband network 109 and processes the same for display on the display screen 104. The STB 106 may also include hardware and software for presenting a graphical user interface (GUI) 110 on the display screen 104.

In alternative embodiments, the STB 106 may be integrated into the TV 102, a mobile computing device, or the like. In still other embodiments, the term "STB" may broadly encompass a personal computer (PC) that performs STB functions. In such an embodiment, a PC may be used to process TV signals and other data received from the broadband network 109. The PC may operate in the context of a home network to provide display signals to a variety of devices, including one or more television sets, computer monitors, personal digital assistants (PDAs), cellular phones, and the like. A variety of home networking systems and protocols may be used, such as Ethernet, 802.11b, Bluetooth, Home PNA, HomePlug, etc.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) technologies. The remote control 108 may further include a number of buttons or other similar controls, such as an "Up" button 116, a "Down" button 118, a "Left" button 120, a "Right" button 122, and a "Select" button 124. Of course, a variety of other buttons or controls may be provided within the scope of the invention. In alternative implementations, the remote control 108 may be embodied as a keyboard, mouse, webpad, PDA, or other suitable input device.

As depicted in FIG. 1, a number of STBs 106 may be interconnected via a broadcast center 126 and the broadband network 109. In the context of a cable television network, a broadcast center 126 is called a "head-end", which is a centrally-located facility within a community where television programming is received from a local cable TV satellite downlink or other source and packaged together for transmission to customer homes.

A broadcast center 126 may also be embodied as a satellite broadcast center within a direct broadcast satellite (DBS) system. A DBS system may utilize a small 18-inch satellite dish, which is an antenna for receiving a satellite broadcast signal. Each STB 106 may be integrated with or coupled to a digital integrated receiver/decoder (IRD), which separates each channel, and decompresses and translates the digital signal from the satellite dish for displayed by the television 102.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 126 may be used to gather programming content, ensure its digital quality, and uplink the signal to the satellites. Programming may be received by the broadcast centers 126 from one or more content providers 130 or networks (e.g., CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal to every earth-station, e.g., every compatible DBS system receiver dish at customers' homes and businesses.

Regardless of the nature of the network 109, the broadcast centers 126 may be coupled directly to one another or through the network 109. In alternative embodiments, broadcast centers 126 may be connected via a separate network, one particular example of which is the Internet 128 (which the network 109 may form a part). The Internet 128 is a "network of networks" and is well known to those skilled in the art. Communication over the Internet 128 is accomplished using standard protocols, such as TCP/IP (Transmission Control Protocol/Internet Protocol) and the like.

As previously noted, an ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients (instant messaging), personal video recorder (PVR) applications, contact directories, and the like. Furthermore, an ITV system 100 may store or provide access to stored media programs, such as PVR recordings, digital photographs, audio (MP3) files, and the like.

Figure 2:
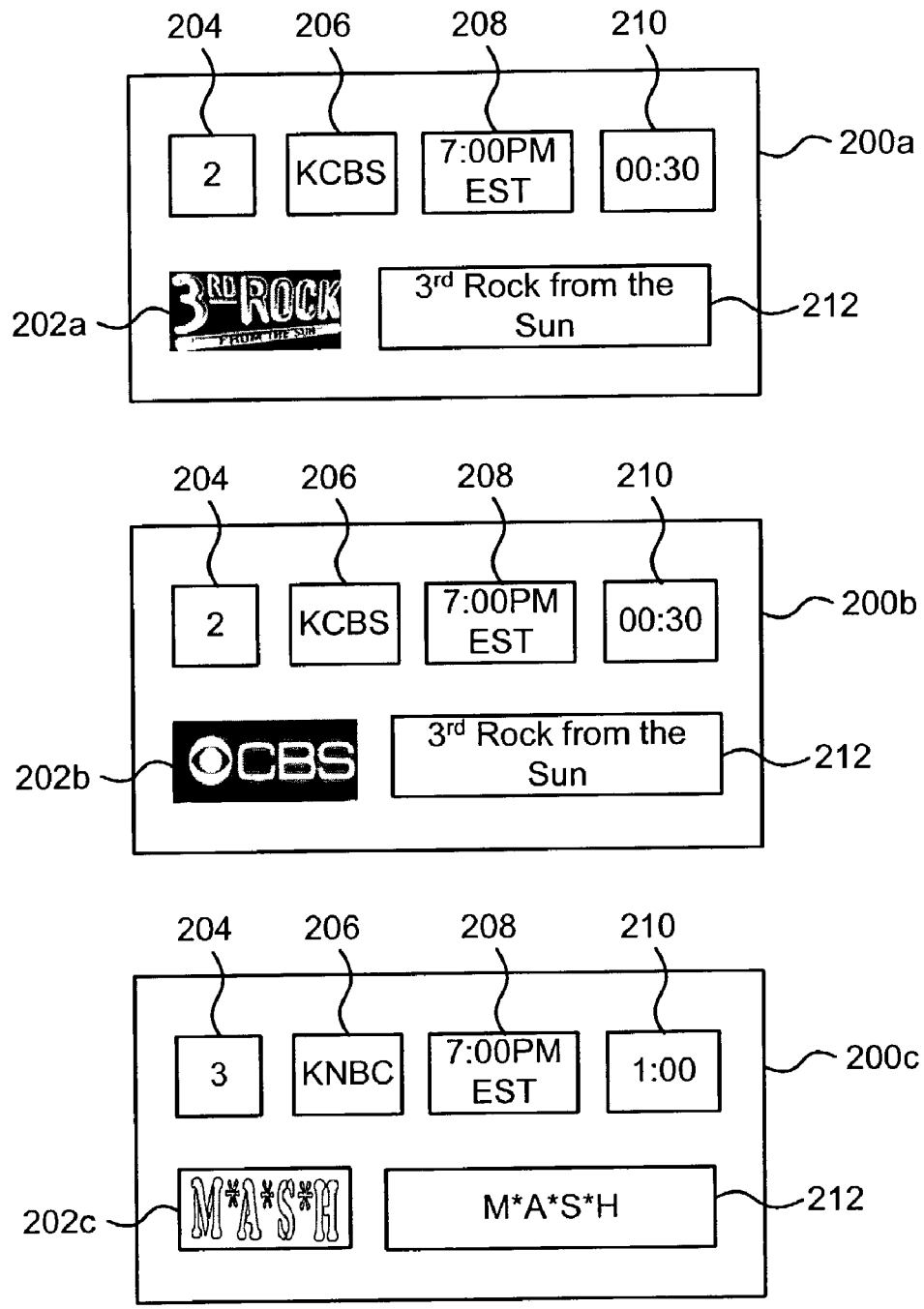
FIG. 2. is an illustration of a plurality of cards for use in focused navigation.

As shown in FIG. 2, each selectable option within the ITV system 100 may be associated with a card 200. A card 200 is an object or other suitable data structure that provides information about and/or access to an available option within an ITV system 100. A card 200 may be embodied as a container of all of the attributes, actions, and/or states needed to facilitate interaction with the option represented thereby. Cards 200 may be stored in any suitable format within a memory or disk drive of the ITV system 100.

Each card 200 may include a graphical representation 202 for display in the GUI 110, as described in greater detail below. The graphical representation 202 may include various types or combinations of artwork, digital photography, captured video frames, animations, or the like.

As depicted in FIG. 2, cards 200a–c may represent television programs or channels. The television programs may be ongoing (live), upcoming, or previously-recorded. In addition to a graphical representation 202, such cards 200 may include, for instance, a channel number 204, a channel name or identifier 206, a starting time 208, a running time 210, and a text description 212. Of course, cards 200 representing other types of options may include additional or different types of information, such as audio/video clips, file or path names, network addresses (URLs), etc.

The graphical representations 202 associated with cards 200 may have different levels of specificity or granularity. For instance, a graphical representation 202a may correspond generally to a television series, e.g., "$3^{rd}$ Rock from the Sun", while another graphical representation 202b may correspond to a television station or network, e.g., "CBS". In other embodiments, a graphical representation 202 may correspond to a specific episode of a television series (e.g., a series premier), or even a product or purchase opportunity associated with the television program. In still other embodiments, a generic graphical representation 202 may be provided, which may be overlaid by the channel number 204, text description 212, or other information, where a more specific card 200 is not available.

Cards 200 may be generated locally within an ITV system 100 or may be received via the broadband network 109 using well known protocols or techniques, e.g., HTTP (hypertext transfer protocol), FTP (file transfer protocol), ATVEF (advanced television enhancement forum) triggers, etc. In one embodiment, a card 200 may be received with data encoded in the vertical blanking interval (VBI) of a television signal. Additionally, information associated with cards 200 (e.g., channel number 204, starting time 208, running time 210) may be dynamically updated with information received in ATVEF triggers.

Figure 3:
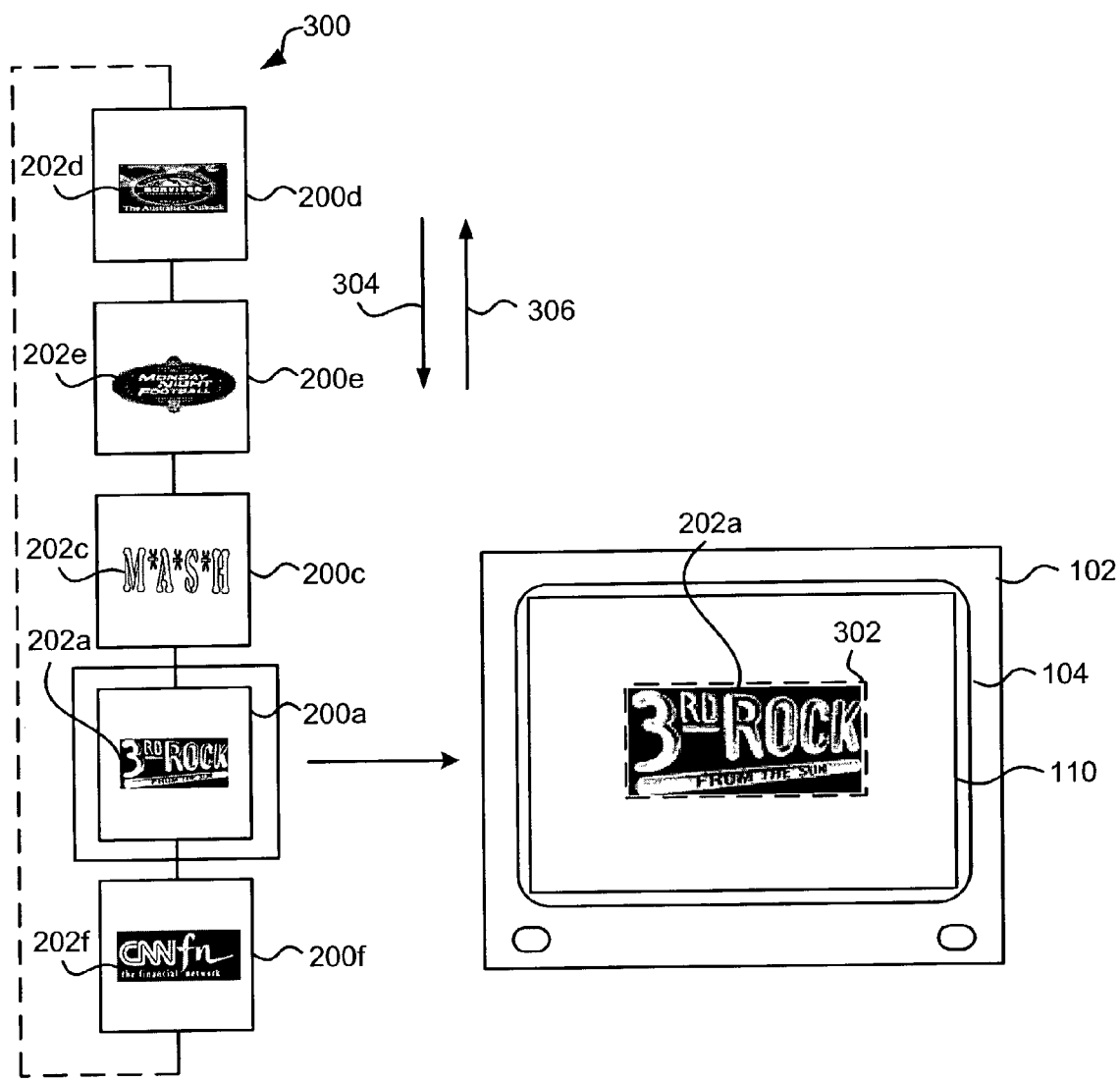
FIGS. 3–6 are illustrations of various techniques for focused navigation of a plurality of options within a user interface.

Referring to FIG. 3, a plurality of cards 200 may be linked or grouped together in a sequence 300. The sequence 300 may be circular (as depicted), linear, or configured in other ways. The sequence 300 may be linked in numerical order by channel number 204, in alphabetical order by the text description 212, or in other preset or user-defined ways. For instance, the sequence 300 may be determined based on one or a combination of other inputs, such as user profile information, user preferences, external events or data feeds (e.g., telephone rings, PVR notifications, alerts for external programming sources).

In the illustrated embodiment, one card 200a in the sequence 300 is typically "active" or in "focus". As shown, the active card 200a may be displayed within a focus area 302 of a GUI 110 displayed on the TV 102. For brevity, the phrase "displaying a card" refers herein to displaying a graphical representation 202 associated with the card 200. Other information associated with the card, e.g., the channel number 204 or text description 212, may or may not be displayed as desired.

A focus area 302 is a single location of the GUI 110 at which the cards 200 are successively displayed (displayed one at a time in sequence). The focus area 302 may be located at a central or visually dominant location of the GUI 110, although the invention is not limited in this respect. As used herein, the term "focused navigation" refers to a technique of displaying a sequence 300 of cards 200 within a focus area 302.

In response to a single initiating action by a user, the cards 200 in a sequence 300 are successively displayed within the focus area 302. Where the sequence 300 is circular, the successive display of cards 200 may continue indefinitely until halted by the user by a subsequent action, as described more fully below.

The action to initiate navigation may be pressing (or pressing and holding down) a button on the remote control 108. For example, the user may press the "Up" button 116 to initiate the successive display in a first direction within the sequence 300 (indicated by line 304), and press the "Down" button 118 to initiate navigation in the opposite direction (indicated by line 306). Alternatively, the user may speak a command into a microphone (either within the STB 106 or remote control 108) to initiate navigation. Of course, the user may initiate navigation in a variety of other ways within the scope of the invention.

In one embodiment, the sequence 300 of cards 200 is successively displayed at a rate selected by the user. For instance, initially pressing the "Up" button 116 may cause the sequence 300 to be displayed at a rate of two cards 200 per second. As the user continues to hold the "Up" button 116, the rate may increase gradually or in steps to any practical rate within the limit of a typical user's ability to recognize individual cards 200 when they are displayed. Many users are able to recognize individual cards 200 at a rate of seven or more cards 200 per second (420 per minute), facilitating rapid navigation of available options.

The cards 200, when displayed within the focus area 302, may be sufficiently large to permit user recognition from a comfortable viewing distance for the particular display screen 104. Thus, unlike PC icons, which typically occupy as little as $\frac{1}{200}$ of the display area of the display screen 104, the displayed cards 200 (and the card 200 in the focus area 302 in particular) may occupy between $\frac{1}{10}$ and $\frac{1}{4}$ of the total display area.

When the user sees a card 200 being displayed of a channel or option that she desires to select or view, the user may take some additional, terminating action and the successive display of cards 200 is halted. For example, where navigation was initiated by pressing and holding down the "Up" button 116, the user may release the "Up" button 116 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Up" or "Down" buttons 116, 118 may result in the previous or next card 200, respectively, being displayed. Alternatively, as described in greater detail below, the ITV system 100 may attempt to determine the delay between the user recognizing the desired card 200 and taking the subsequent action and compensate for that delay by reverting to a previously-displayed card 200.

The user may select the channel or option associated with the displayed card 200 by taking a selection action. For instance, the user may press the "Select" button 124 on the remote control 108. Alternatively, the selection action may simply be waiting a set amount of time without activating any controls on the remote control 108.

The effect of activating the card 200 will vary dramatically depending on the type of card 200. For instance, in the case of a card 200 representing a live television program, the GUI 110 may be replaced by a full-size version of the program. Alternatively, activating a card 200 corresponding to a purchase opportunity may result in the display of a web browser directed to a particular website.

Figure 4:
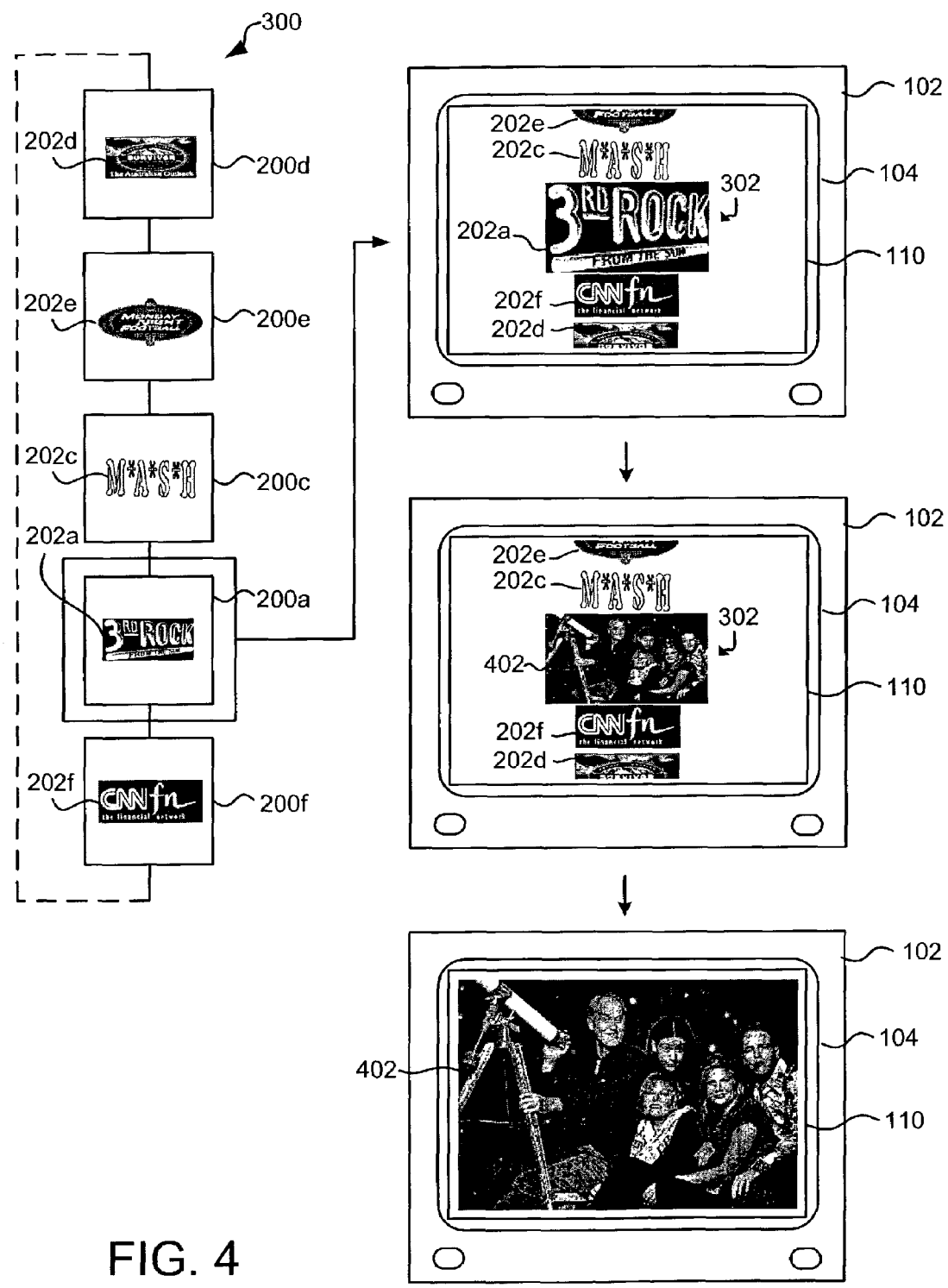

As shown in FIG. 4, one or more previous and next cards 200 within the sequence 300 may be displayed along an axis (not shown) of the GUI 110 to provide the user with a more complete navigational context within the sequence 300. In one embodiment, the axis is an imaginary line that extends across the GUI 110 in a particular direction and intersects the focus area 302. For example, at least a subset of the sequence 300 of cards 200 may be displayed along a vertical axis, with the active card 200a being displayed in the focus area 302. In alternative embodiments, the cards 200 may be displayed along horizontal or diagonal axes, or in other suitable ways.

Typically, one or more cards 200 in a sequence 300 are not displayed. These off-screen or hidden cards may be dynamically changed, replaced, or updated during navigation, e.g., a card 200 representing an advertisement may change from one sponsor to another.

When a user activates one of the navigation buttons of the remote control 108 (e.g., the "Up" or "Down" buttons 116, 118), the displayed cards 200 in the sequence 300 may be scrolled (e.g., shifted or cycled) downward or upward, respectively, with a new card (e.g., card 200c or 202f) entering the focus area 302. Alternatively, the "Left" or "Right" button 120, 122 may be used for the same purpose.

As depicted, the card 200a in the focus area 302 may be visually emphasized in various ways. For example, the card 200a may be enlarged relative to the other displayed cards 200. Alternatively, the card 200a may be animated, marked, illuminated, highlighted, or otherwise set apart from the other cards 200.

In certain embodiments, if the user allows a card 200 representing a live television program to remain in the focus area 302 for a certain amount of time (e.g., 2 seconds), the card 200a may be overlaid by a video window 402 showing the live television program. Furthermore, if the user continues to linger on the card 200a (or if the user presses the "Select" button 124), the video window 402 may be enlarged 402 to fill the entire display screen 104. Other types of cards 200 may exhibit different types of behaviors when the card 200 remains in the focus area 302 for an established period of time.

Where the cards 200 represent live television programs, a card 200 corresponding to the currently-tuned channel (at the current date and time) may be selected by default for display in the focus area 302 each time the GUI 110 is shown. This may occur, for instance, when the user is watching TV and presses a button (such as the "Select" button 124) in order to display the GUI 110. Additionally, an indication of the currently-displayed card 200 in the focus area 302 may be stored in non-volatile memory or otherwise maintained such that if a reset condition occurs (e.g., the STB 106 is rebooted or reset after a power loss, etc.) the last-displayed card 200 may be restored to the focus area 302.

Figure 5:
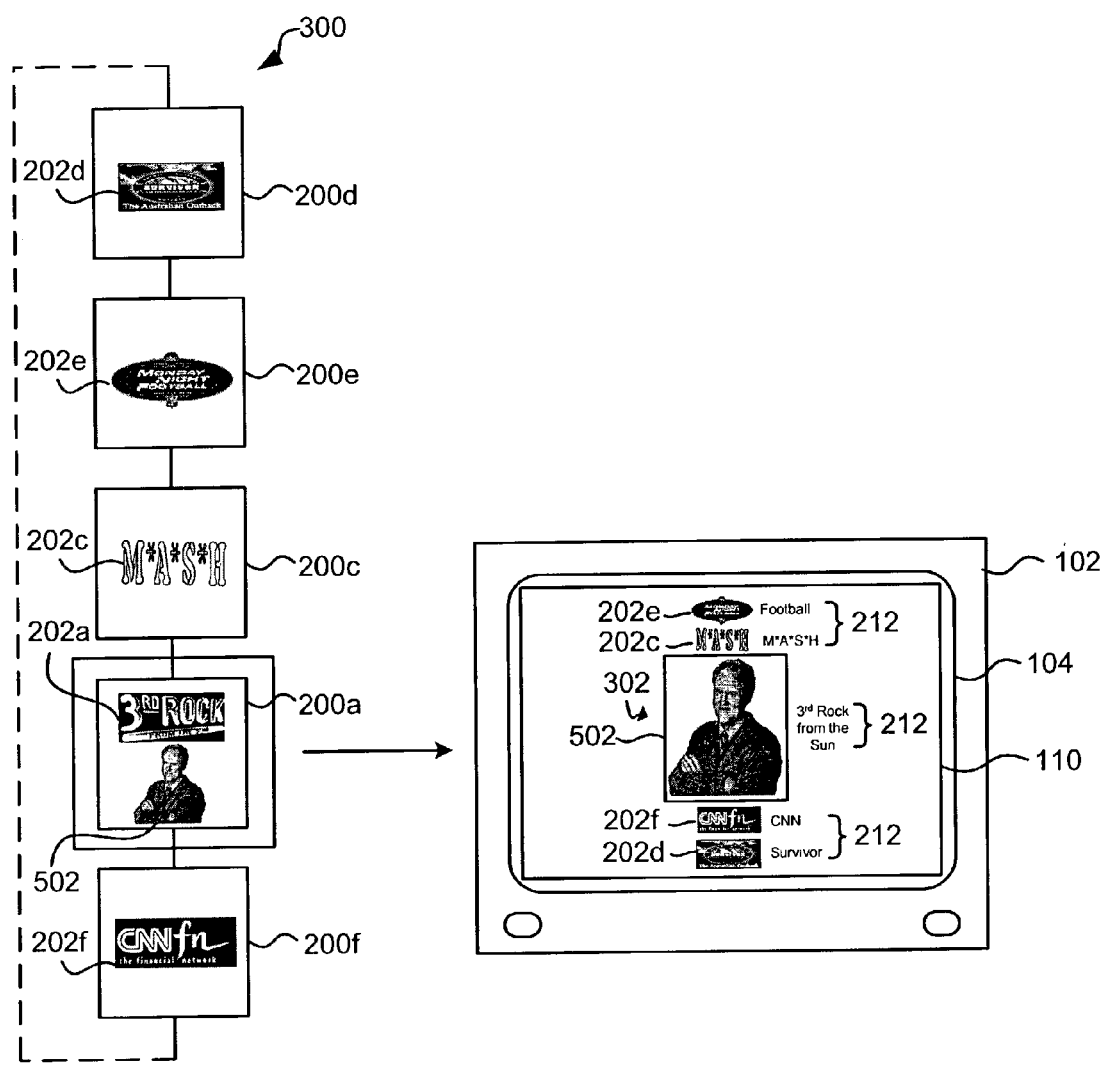

Referring to FIG. 5, cards 200 may include one or more alternative graphical representations 502, which may be displayed when the card 200 enters the focus area 302. As depicted, cards 200c–f displayed outside of the focus area 302 are shown using a first graphical representation 202c–f. However, when the card 200a enters the focus area 302, the alternative graphical representation 502 is shown. Providing an alternative graphical representation 502 allows a designer to provide a more detailed or higher-resolution image for display in the focus area 302, which may be enlarged relative to other graphical representations 202 outside of the focus area 302.

In certain implementations, various types of supplemental information, such as text descriptions 212, may be displayed next to the graphical representations 202, 502 in the GUI 110 to aid the user in identifying and knowing the status of the corresponding options. Sometimes a graphical representation 202 may simply be a picture or logo, which may not be familiar to every user. The addition of a text description 212 is helpful in such cases.

The text description 212 may be displayed above, below, or to the side of the graphical representation 202, 502. Moreover, the text may be of a suitably large size to be easily discernable by the user from a normal viewing distance.

During navigation, the text descriptions 212 are shifted or cycled with the corresponding graphical representations 202, 502.

In the depicted embodiment, the text descriptions 212 identify a television programs or series, and are shown to the right of the corresponding graphical representations 202. Of course, many other types of text descriptions 212 may be provided, and different placements or orientations of the text descriptions 212 are contemplated.

Figure 6:
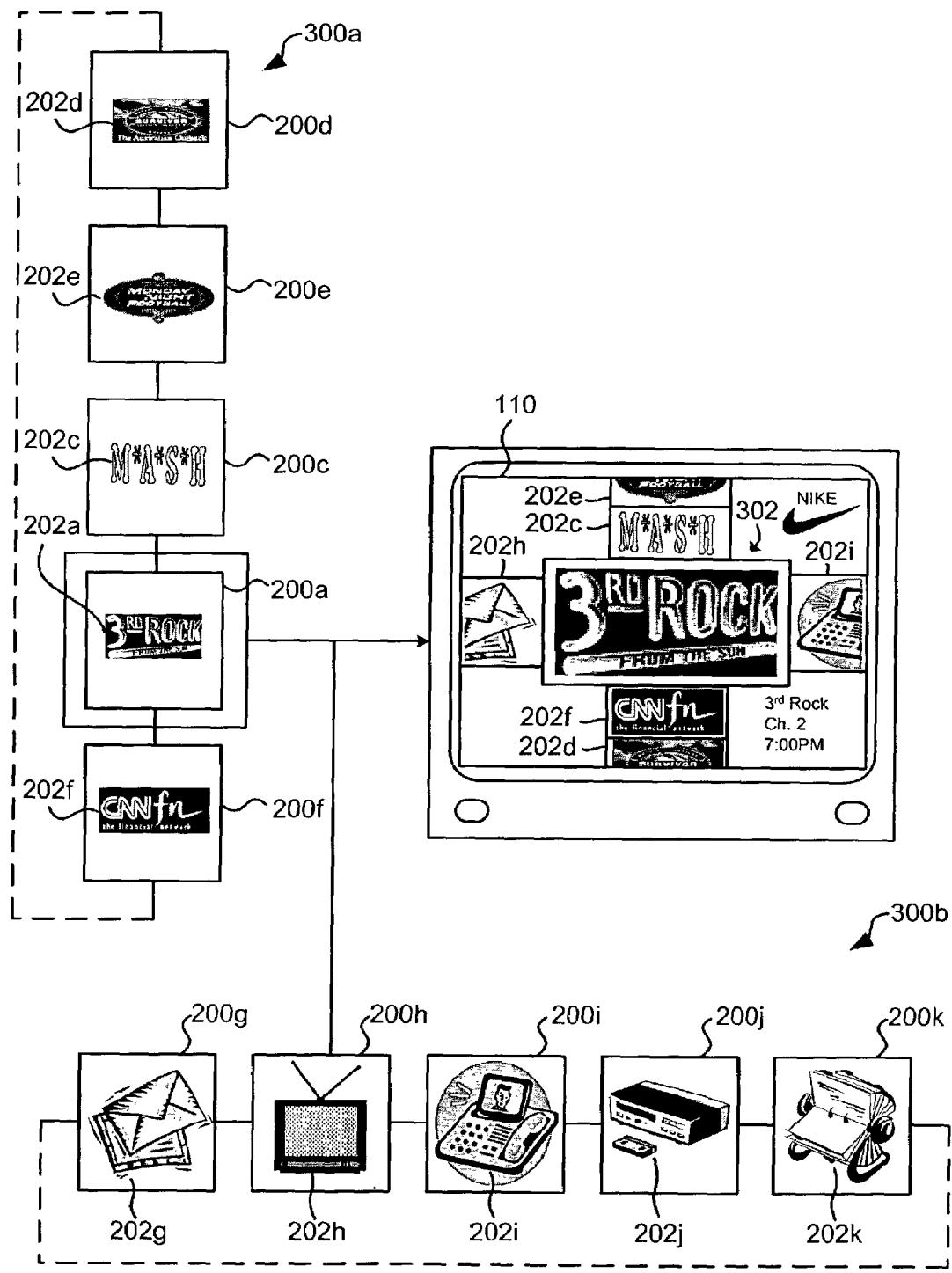

Referring to FIG. 6, multiple sequences 300a–b including different types of cards 200 may be displayed simultaneously. For instance, one or more cards 200 from a sequence 300a representing television programs may be displayed as described in reference to FIG. 4. In addition, one or more cards 200 from a sequence 300b representing interactive channels, applications, or digital media, may also be displayed.

As illustrated, the second sequence 300b may be displayed horizontally, perpendicular to the first sequence 300a, such that the sequences 300a–b intersect at (and define) the focus area 302. Any number of sequences 300 may be displayed on the GUI 110 simultaneously. Of course, the selection of vertical and horizontal for the sequences 300a–b is merely exemplary and not required.

In the depicted embodiment, the "Up" and "Down" buttons 116, 118 may be used to shift or cycle the vertically-displayed sequence 300a within the GUI 110 in order to bring one of the corresponding cards 200a–e into the focus area 302. Likewise, the "Left" and "Right" buttons 120, 122 may be used to shift or cycle the horizontally-displayed sequence 300b to bring one of the corresponding cards 200g–k into the focus area 302.

In one implementation, bringing a card 200 from one sequence 300 into the focus area 302 will determine or change which other sequence 300 is displayed. For example, bringing the card 200h (TV shape) from the horizontal sequence 300b into focus may result in the vertical sequence 300a (television programs) being displayed. Alternatively, bringing the card 200g (envelope shape) into focus may result in a vertical sequence 300 (not shown) corresponding to e-mail messages or contacts. Likewise, bringing the card 200i (videophone shape) into focus may result in a vertical sequence 300 of a videoconferencing buddy list, while the card 200j (VCR shape) may display a vertical sequence 300 of television programs recorded by a PVR. In alternative embodiments, a selection from a vertical sequence 300 may affect which horizontal sequence 300 is displayed.

Figure 7:
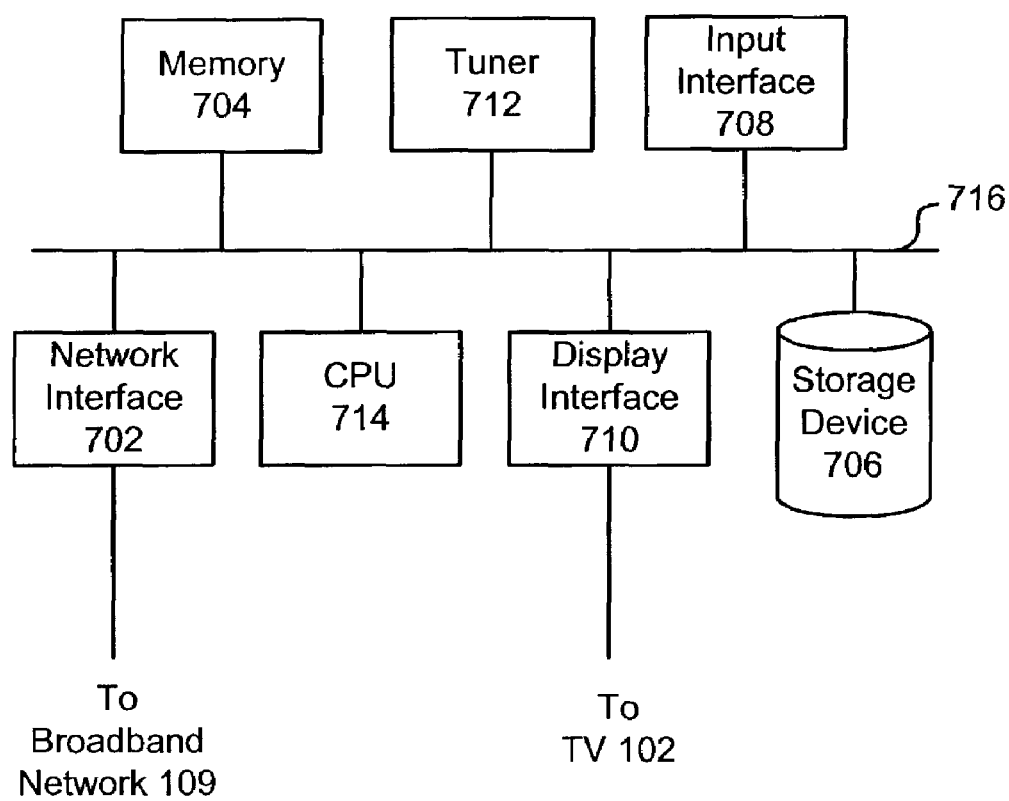
FIG. 7 is a block diagram of a set-top box (STB)

FIG. 7 is a block diagram of an STB 106 according to an embodiment of the invention. The illustrated components may be logical or physical and may be implemented using any suitable combination of hardware, software, and/or firmware.

In one configuration, the STB 106 includes a network interface 702 for communicating with the broadband network 109. The network interface 1402 may conform to the DOCSIS (Data Over Cable Service Interface Specification) or DAVIC (Digital Audio-Visual Council) cable modem standards. Additionally, the network interface 702 may include standard circuitry for receiving MPEG streams including multiplexed television programs and data from the broadband network 109. One or more sequences 300 of cards 200 may be received by the interface 702 from a server accessible via the broadband network 109 or the Internet 128 via HTTP, ATVEF triggers, or other mechanisms.

The STB 106 further includes a memory 704, such as a random access memory (RAM) and/or read-only memory (ROM). The memory 704 may store an operating system (OS) for the STB 106 (e.g., Windows CE® or Linux®), application program code, and various types of data. In one embodiment, the memory 704 stores one or more sequences 300 of cards 200 may be stored within a storage device 706, such as a hard disk drive, optical storage device, or the like.

An input interface 708 may be provided for receiving commands from an input device, such as a remote control 108. In one embodiment, the input interface 708 may include or be associated with the wireless receiver 114 described in connection with FIG. 1. The input interface 708 may detect a single user action for initiating navigation, such as the user pressing the "Up" or "Down" buttons 116, 118 on the remote control 108.

The STB 106 may further include a display interface 710 for generating a GUI 110 on an attached TV 102 or other display device. In addition, the display interface 710 may be responsible for successively displaying cards 200 from one or more stored sequences 300 in a focus area 302 of the GUI 110 in response to the single user action being detected by the input interface 708. Likewise, the display interface 710 may be responsible for halting the successive display in response to detection of a subsequent user action.

A tuner 712 may be included for demodulating and demultiplexing selected MPEG streams received by the STB 106 from the broadband network 109. The tuner 712 may be used to tune to a particular television program in response to a user selection of a card 200, e.g., in response to the user pressing the "Select" button 124 or when the user "lingers" on a card 200 in the focus area 302.

A CPU 714 controls the operation of the STB 106, including the other components described above, which may be in electrical communication with the CPU 714 via a bus 716. The CPU 714 may be embodied as a microprocessor, a microcontroller, a digital signal processor (DSP) or other device known in the art. For instance, the CPU 714 may be embodied as an Intel® x86 processor. The CPU 714 may perform logical and arithmetic operations based on program code stored within the memory 704 or the storage device 706.

Of course, FIG. 7 illustrates only one possible configuration of an STB 106. Those skilled in the art will recognize that various other architectures and components may be provided within the scope of the invention. In addition, various standard components are not illustrated in order to avoid obscuring aspects of the invention.

Figure 8:
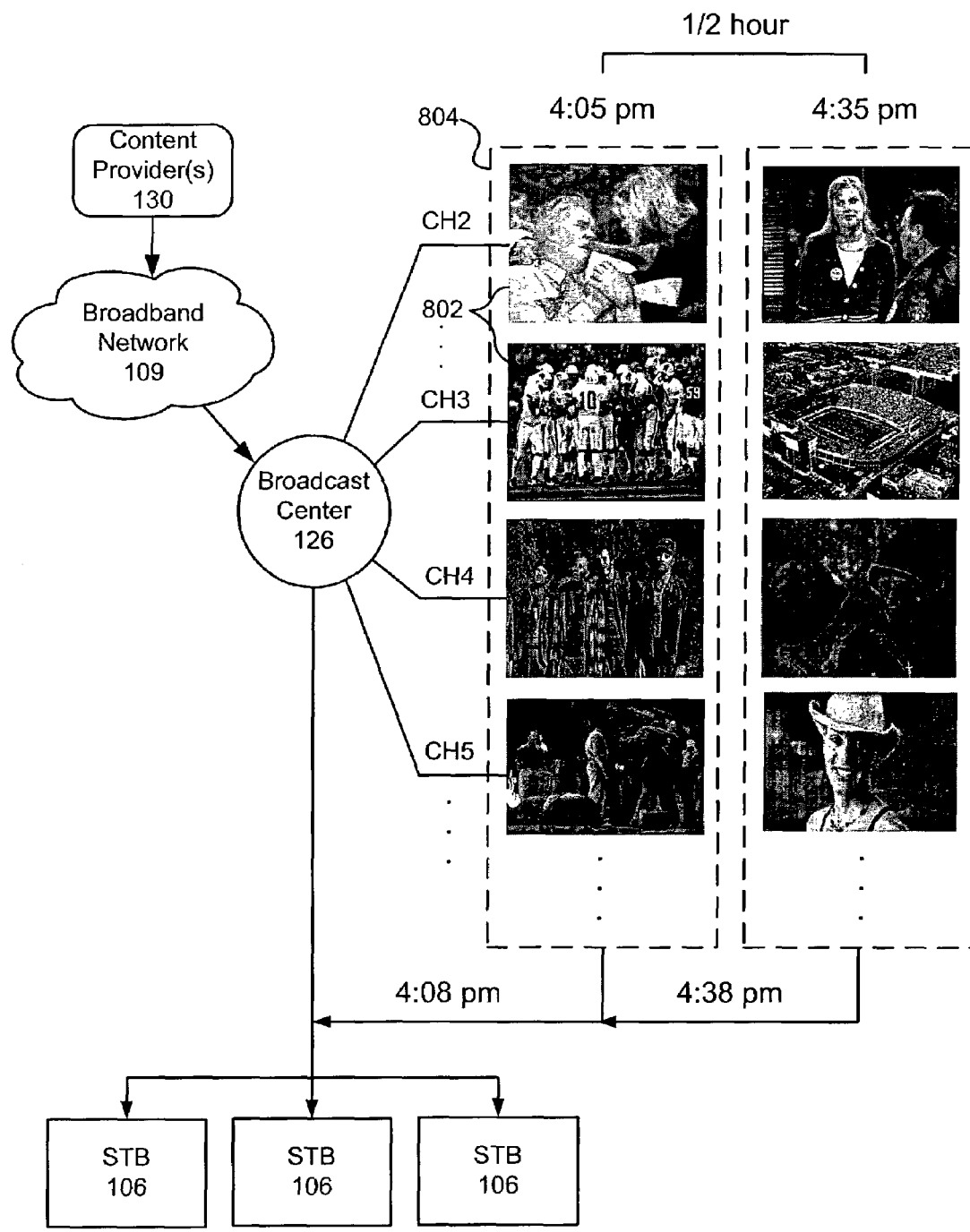
FIG. 8 is an illustration of a technique for capturing video frames from a television broadcast at periodic intervals.

In one embodiment, as depicted in FIG. 8, video frames 802 captured from a television broadcast may be used as graphical representations 202 for some or all of the channels in focused navigation. The video frames 802 may be captured from analog sources or digital sources (e.g., I-frames within an MPEG stream).

The video frames 802 may be captured at regular intervals, e.g., every hour or every thirty minutes, for each available channel (or designated channels). For instance, as shown in FIG. 8, capture may commence at five minutes past the half hour in order to avoid commercials and/or opening credits.

In the depicted embodiment, the video frames 802 may be centrally captured at a broadcast center 126, which receives television broadcasts from one or more content providers 130 for distribution to a plurality of STBs 106. A broadcast center 126 may include multiple tuners, which may operate in parallel to successively tune to each available channel to capture a video frame 802 being broadcast on each channel.

The captured video frames 802 may then be packaged by the broadcast center 126 into update packages 804, which are data structures adapted for periodic transmission to the STBs 106 associated with the broadcast center 126. The update packages 804 may be embodied in any suitable format, such as XML documents or the like. The video frames 802 within the packages 804 may be tagged or associated with an indication of the channel from which the frames 802 were captured. Alternatively, the packages 804 may be organized (e.g., sequentially) by channel number such that the original channel may be later identified.

In various embodiments, video frames 802 and/or update packages 804 are compressed to reduce transmission bandwidth. Various compression techniques may be used, such as JPEG, GIF, TIFF, PNG, 7-Zip, or any other suitable compression method. Thereafter, the update packages 804 may be transmitted to the STBs 106 at regular intervals, e.g., at eight minutes past the half-hour, using IP multicast or other techniques for efficiently sending data to many recipients simultaneously.

Figure 9:
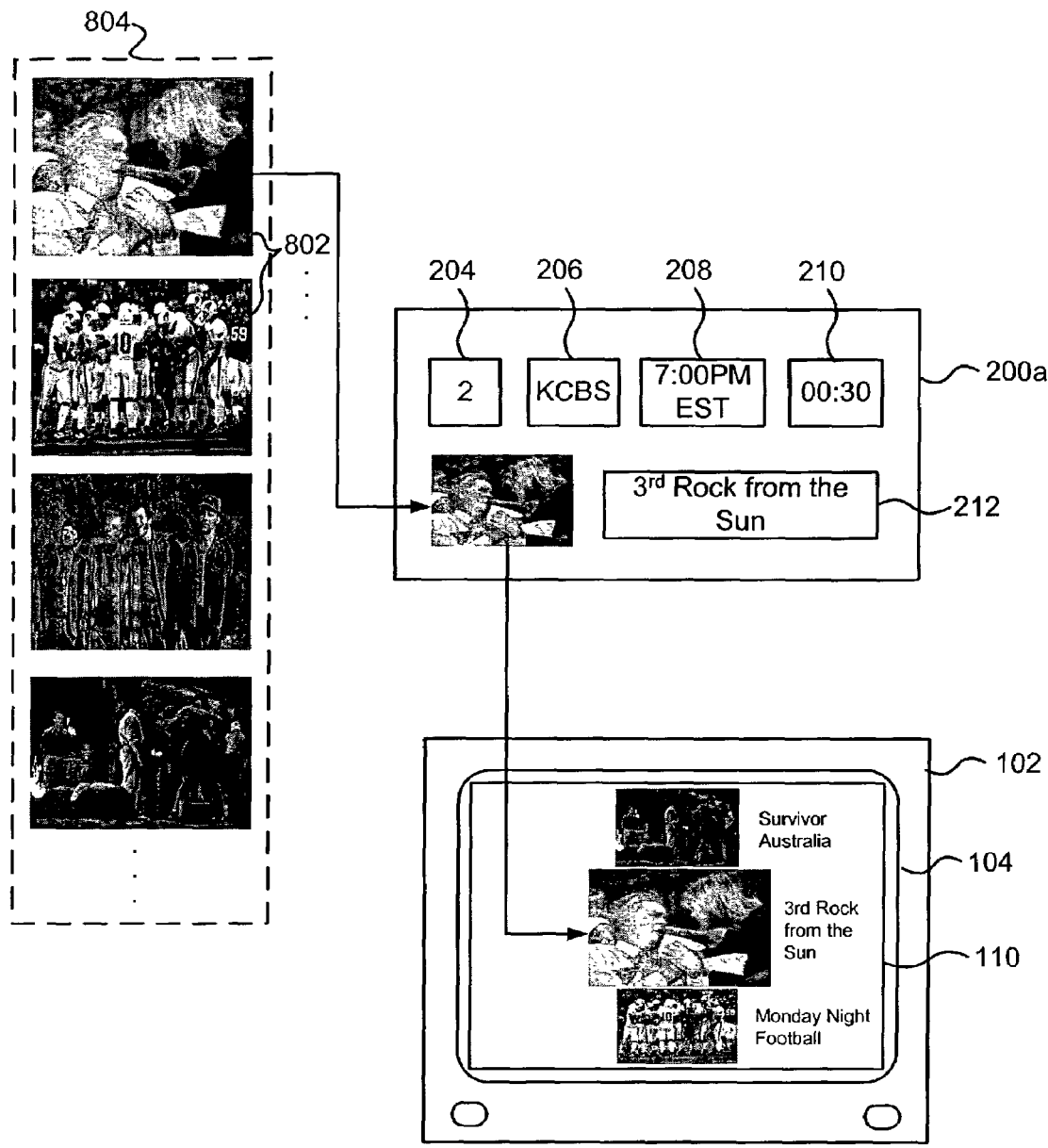
FIG. 9 is an illustration of a technique for associating captured video frames with cards for use in focused navigation.

When an update package 804 is received, as shown in FIG. 9, the video frames 802 may be unpackaged (parsed) and then associated with the corresponding cards 200. This may be accomplished by means of channel tags associated with the video frames 802, by means of the organization of the package 804, or in other ways. In one embodiment, a video frame 802 may be stored within or linked to the corresponding card object.

Thereafter, the cards 200 containing video frames 802 may be used in the context of focused navigation, as previously described. However, rather than being presented with generic, pre-prepared artwork, a user may be presented with actual scenes from the particular television program being broadcast, which may assist a user in determining whether to tune to a channel. Of course, in certain configurations, a user may be presented with both pre-prepared artwork and video frames 802 during focused navigation.

Figure 10:
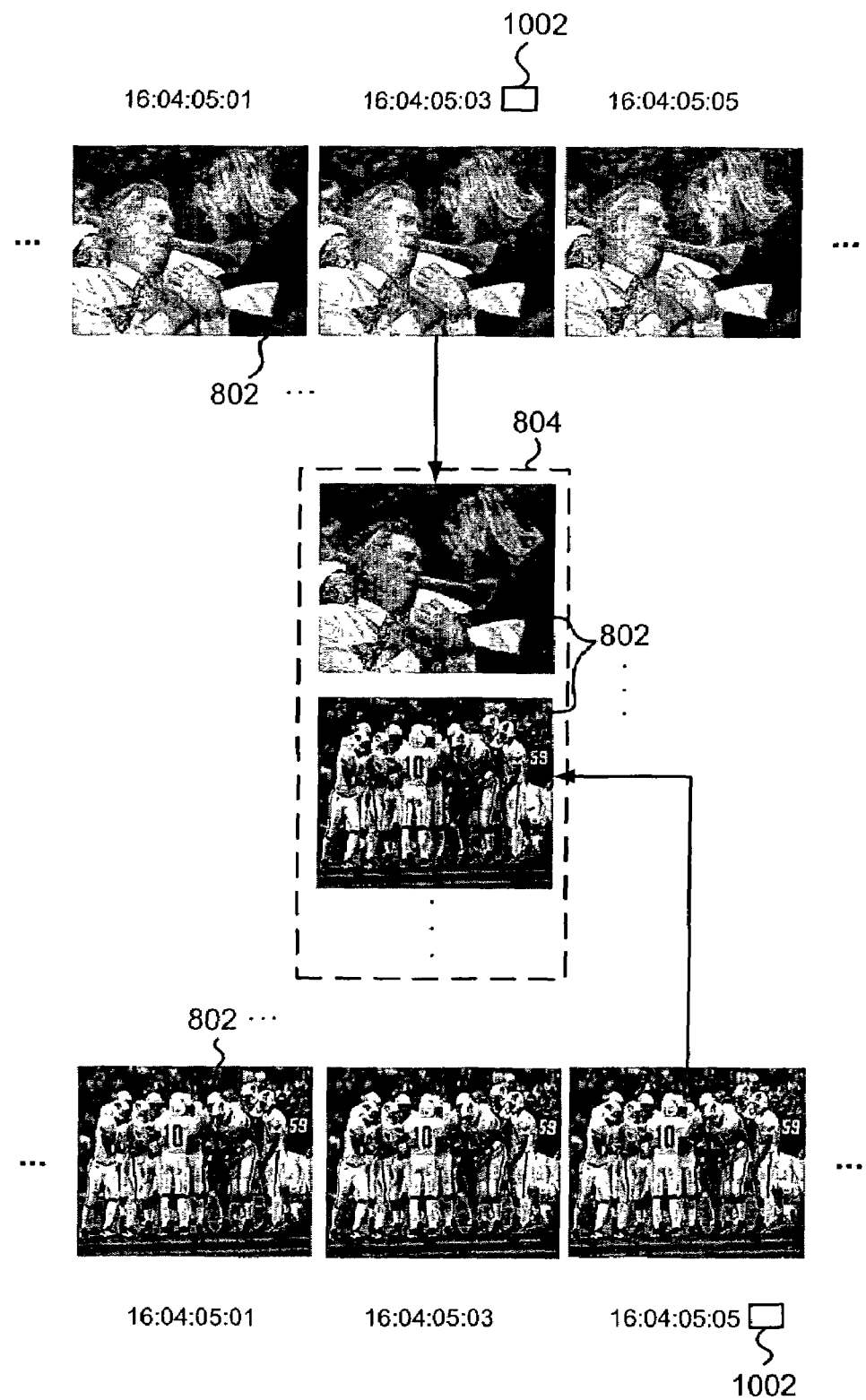
FIG. 10 is an illustration of a technique for capturing video frames from a television broadcast based on embedded tags.

In an alternative embodiment, as depicted in FIG. 10, video frames 802 may not be captured at periodic intervals. Rather, tags 1002 may be inserted into the television broadcast to indicate when a video frame 802 should be captured for a particular channel, i.e. the frame 802 is captured when the tag 1002 is detected. The tags 1002 may be implemented as special MPEG packets, ATVEF triggers, or the like.

One difficulty with capturing video frames 802 based on time intervals is that the captured frame 802 may not be particularly relevant to, or descriptive of, the program being currently broadcast. For instance, the frame 802 may entirely consist of a shot of a blank wall, which would not assist the user in determining whether to view the channel. Inserting tags 1002 into the broadcast gives content producers 130 the ability to select highly relevant frames (or at least avoid misdescriptive or irrelevant ones) for use in focused navigation.

In a related embodiment, a content provider 130 may provide a schedule (not shown) of times at which the video frames 802 should be captured for each channel. This embodiment produces essentially the same results as the tag-based embodiment, but does so with a single schedule update rather than a series of tags 1002.

In any of the above-described embodiments, the capturing of a video frame 802 may be attempted, albeit inadvertently, during a commercial break. In general, capturing a video frame 802 of an advertisement would be of little value to a user in determining whether to view a particular channel.

Figure 11:
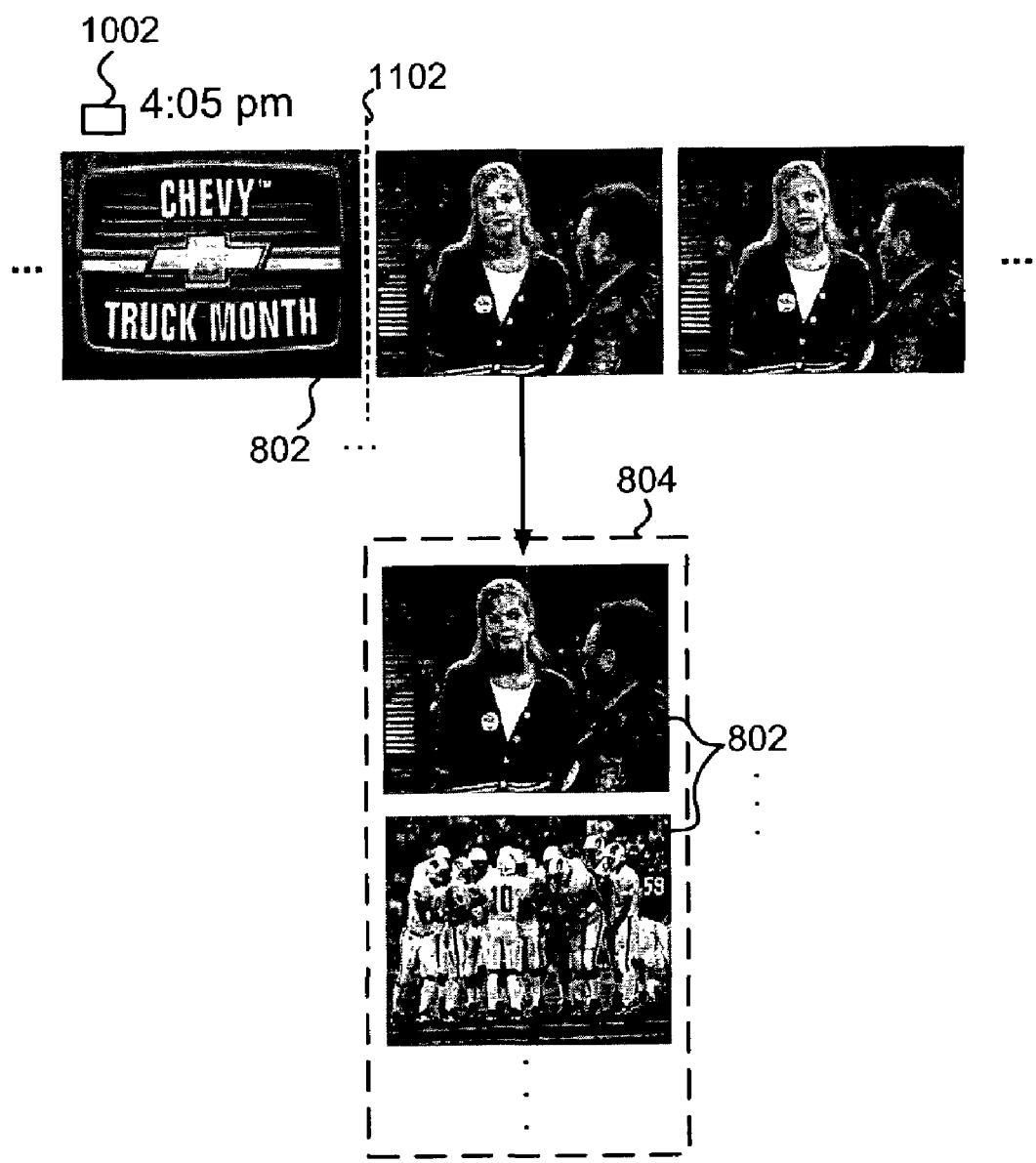
FIG. 11 is an illustration of a technique for delaying the capture of a video frame until after a commercial break.

In one implementation, as shown in FIG. 11, commercial breaks are detected in order to not capture video frames 802 comprising advertisements. This may be accomplished using various known indicators of commercials, e.g., lapses in closed captioning greater than a particular threshold, occurrences of black frames, high rates of scene changes and motion, discrete messages or triggers identifying a commercial, etc.

For instance, in the depicted embodiment, a frame 802 during a commercial break would have been captured due to a tag 1002 or, alternatively, the time of day. In such a situation, a frame 802 is not captured until a point after the end of the commercial break, indicated by dashed line 1102.

Figure 12:
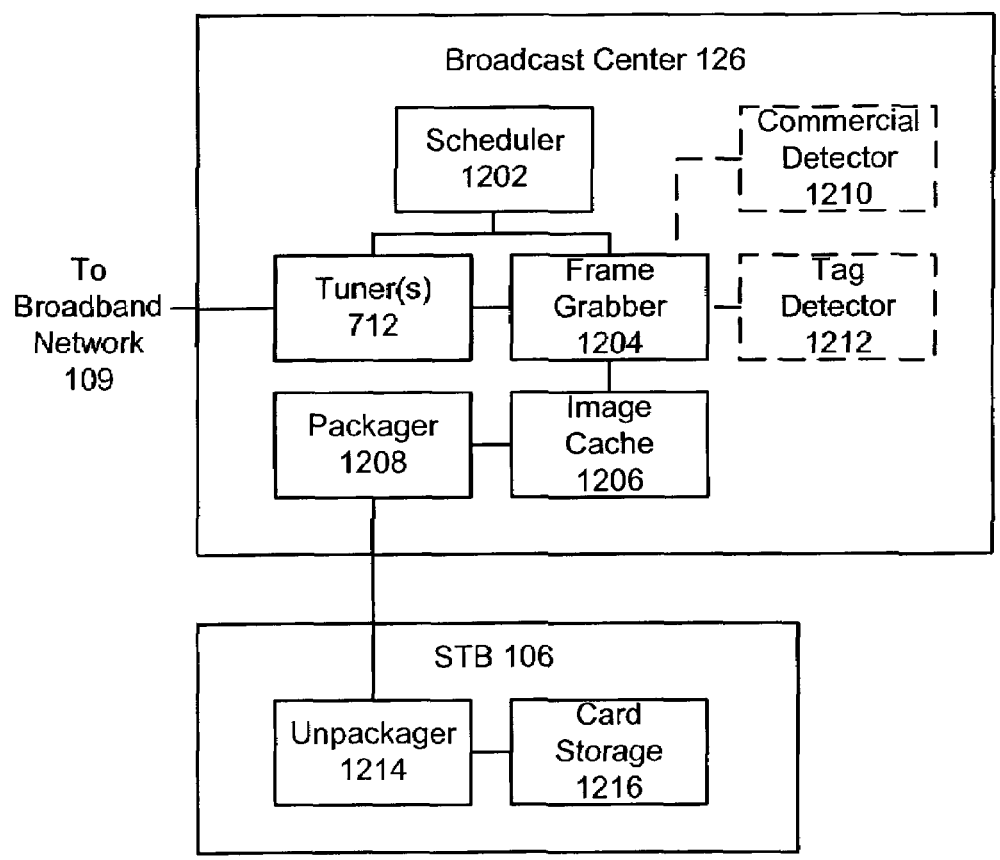
FIG. 12 is a block diagram of a system for capturing video frames within a broadcast center.

Referring now to FIG. 12, there is shown a block diagram of a system 1200 within a broadcast center 126 for capturing video frames 802 for use in focused navigation. The illustrated components may be implemented using any suitable combination of hardware, software, or firmware, as will be known to those of skill in the art. The broadcast center 126 may include a server having a hardware configuration similar to the one shown in FIG. 7, but with faster processors, more memory, etc., than an STB 106.

In one embodiment, a scheduler 1202 determines when to initiate the capture of one or more video frames 802. As previously indicated, this may be done at regular intervals or be based on a schedule provided by a content provider 130. The scheduler 1202 includes or has access to a clock (not shown) for accurately determining the current time of day.

When the time to capture the video frames 802 has arrived, the scheduler 1202 signals a tuner 712 within the broadcast center 126 to tune to the first available channel (or a channel for which a tag 1002 was detected). In certain embodiments, the broadcast center 126 may include a plurality of tuners 712, which may operate in parallel to successively tune to each available channel.

Once the tuner 712 has been tuned to the desired channel, the scheduler 1202 and/or tuner 712 signals a frame grabber 1204 to capture the frame 802 being currently broadcast. The frame grabber 1204 may include an MPEG decoder for capturing frames 802 from an MPEG-encoded broadcast. Alternatively, the frame grabber 102 may include a standard video capture device for capturing a video frame 802 from an analog broadcast. Numerous video capture devices are available from Hauppauge™, ATI™, Dazzle™, Pinnacle™, and other manufacturers. In one configuration, the frame grabber 1204 may include or have access to a frame buffer (not shown) that stores a copy of the current frame 802. Accordingly, the frame grabber 1204 may make a copy of the frame buffer in order to capture a frame 802.

The captured frame 802 may be temporarily stored in an image cache 1206 until all of the frames 802 corresponding to the available channels (or tagged channels) have been captured. Thereafter, a packager 1208 may package the captured frames 802 within an update package 804, as described with reference to FIG. 8. This may include compressing the frames 802, associating the stored frames 802 with indicia of the corresponding channels, etc.

In certain configurations, the broadcast center 126 may further include a commercial detector 1210 for detecting commercial breaks within a broadcast. When a commercial break is detected, the commercial detector 1210 produces a signal that inhibits the capture of frames 802 by the frame grabber 1204.

The broadcast center 126 may also include a tag detector 1212 for implementing the embodiment described with reference to FIG. 10. In one embodiment, the tag detector 1212 detects the presence of an embedded tag 1002 within the broadcast and generates a signal that causes the frame grabber 1204 to immediately capture the current frame 802.

At periodic intervals, the update package 804 is transmitted to one or more STBs 106 associated with the broadcast center 126. The broadcast medium may be wired or wireless depending on the type of network, e.g. cable or satellite.

An unpackager 1214 within an STB 106 may unpackage or parse the frames 802 stored within the update package 804. The unpackager 1214 may further associate the resulting frames 802 with corresponding cards 1212 within a card storage 1216, such as a RAM memory or hard disk drive, as described in connection with FIG. 9.

Figure 13:
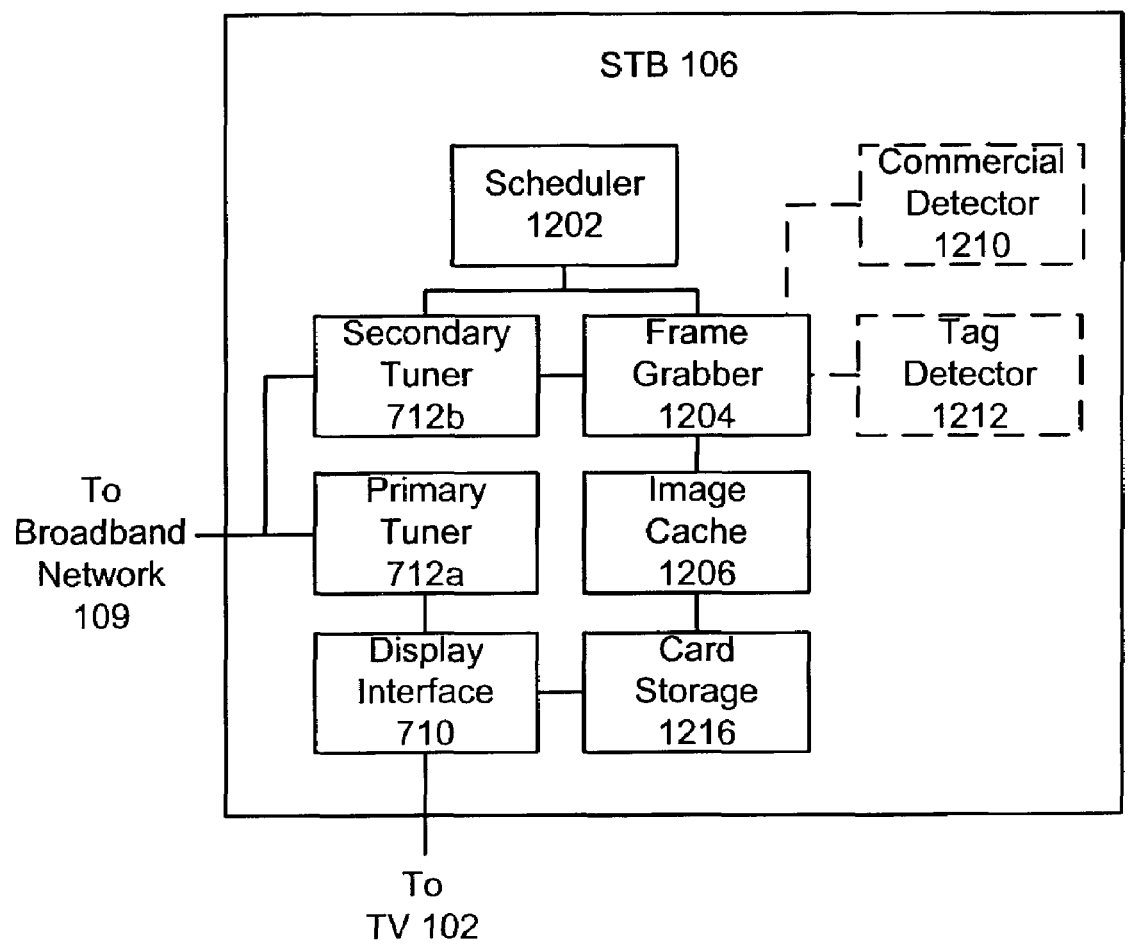
FIG. 13 is a block diagram of a system for capturing video frames within an STB.

FIG. 13 is a block diagram of an alternative embodiment of the invention in which video frames 802 are captured locally within an STB 106 rather than a broadcast center 126. In such an embodiment, at least two tuners 712 are desirable in order that the capturing of video frames 802 does not interfere with television viewing.

As shown in FIG. 13, a primary tuner 712a interacts with the display interface 710 to allow the user to tune to and view a desired channel. The secondary tuner 712b, on the other hand, may be used to successively tune to each available channel and capture video frames 802 for use in focused navigation. As such, the output of the secondary tuner 712b need not be provided to the display interface 710, but rather, to the frame grabber 1204.

Increasingly, STBs 106 employ secondary tuners 712b for personal video recording (PVR) applications. As a result, the capture of video frames 802 may be interrupted, in one embodiment, while the secondary tuner 712b is being used to digitally record a television program. In alternative embodiments, however, the secondary tuner 712b may be reserved for PVR applications, while a third tuner (not shown) is provided for multiple functions, including capturing video frames 802, assisting the secondary tuner 712b in PVR applications, and/or providing output for an additional television 102 within a home.

The other components of the system 1200 represented within FIG. 13, e.g., the scheduler 1202, frame grabber 1204, image cache 1206, commercial detector 1210, tag detector 1212, etc., operate substantially as described in connection with FIG. 12., except that the components are located within an entertainment system (e.g., STB 106) rather than the broadcast center 126.

Figure 14:
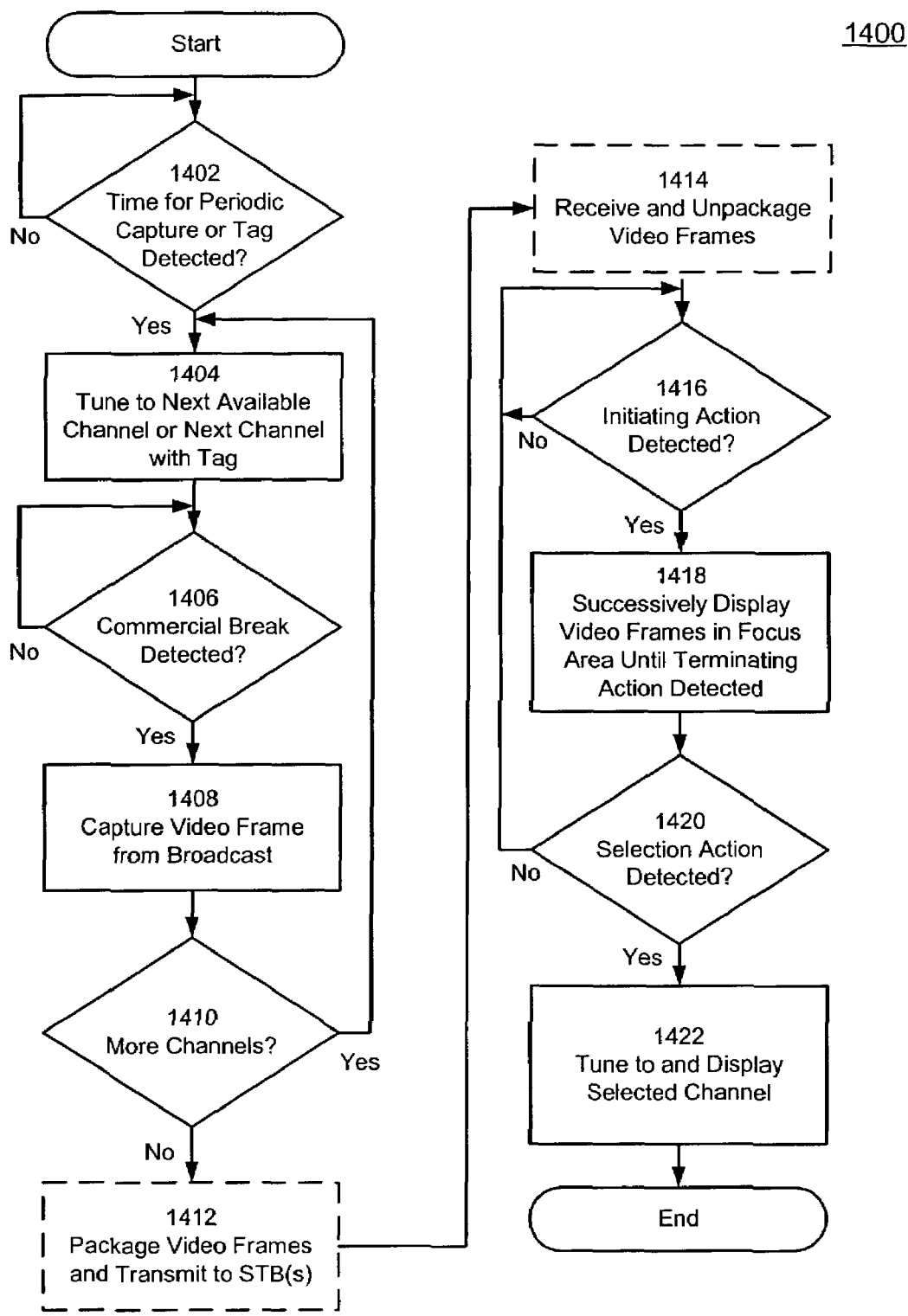
FIG. 14 is a flowchart of a method for capturing video frames from a television broadcast for use in focused navigation.

Referring to FIG. 14, there is shown a flowchart of a method 1400 for capturing video frames 802 for use in focused navigation. The method 1400 begins by determining 1402 whether the time has arrived for periodically capturing the video frames 802 or whether a tag 1002 has been detected for one or more channels.

If so, the method 1400 continues by tuning 1404 to the next available channel or the next channel for which a tag 1002 has been detected. Otherwise, the method 1400 waits at step 1402 until either case is satisfied.

After step 1404, a determination 1406 is made whether a commercial break has been detected on the tuned channel. If a commercial break has been detected, the method 1400 waits at step 1406 until the commercial break is over.

If no commercial break was detected, or after the commercial break is over, the method 1400 continues by capturing 1408 a video frame 802 from the broadcast on the tuned channel. Thereafter, a determination 1410 is made whether there are more available channels or channels with tags 1002 for which a video frame 802 needs to be captured. If more channels remain, the method returns to step 1404 to tune to the next channel.

If, however, video frames 402 have been captured for all available channels or channels with tags, the method 1400 optionally continues by packaging 1412 the video frames 802 into an update package 804 and transmitting the update package 804 to one or more STB(s) 106 (in the case of an embodiment in which video frames 802 are captured at a broadcast center 126). Likewise, the method 1400 may optionally continue by receiving 1416 and unpackaging the video frames 802 from the update package 804 at an STB 106.

Within the STB 106, a determination 1416 is made whether an initiating action by a user (e.g., pressing a designated button on the remote control 108) has been detected. If so, the method 1400 continues by successively displaying 1418 the video frames 802 within a focus area 302 of a GUI 110 until a terminating action (e.g., pressing a same or different button or releasing the first button) has been detected, after which the successive display of video frames 802 is halted to show a particular video frame 802 corresponding to a selected channel.

Thereafter, a determination 1420 is made whether a selection action has been detected (e.g., pressing a selection button on the remote control 108). If no selection action has been detected, the method 1400 returns to step 1416 to await another initiating action. Otherwise, the method 1400 concludes by tuning to 1422 and displaying the selected channel, i.e. the channel corresponding to the video frame 802 remaining in the focus area 802 after the terminating action.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for enabling access to a plurality of channels within a user interface, the method comprising:
   capturing a video frame from a respective broadcast on each of a plurality of channels, each channel to be represented within the user interface by a single captured video frame;
   scrolling a linear sequence of the captured video frames representing different channels, one video frame at a time, through a single, non-moving focus area within the user interface in response to a single initiating action by a user, the scrolling of video frames automatically proceeding until being terminated by the user; and
   discontinuing the scrolling of video frames to show a particular video frame corresponding to a selected channel in response to a single terminating action by the user.

2. The method of claim 1, further comprising:
   repeating the capturing of video frames for the plurality of channels after an established time interval.

3. The method of claim 2, wherein the interval comprises an hour.

4. The method of claim 2, wherein the interval comprises a half-hour.

5. The method of claim 1, further comprising:
   in response to automatically detecting a commercial break being broadcast on a particular channel,
   automatically delaying the capture of a video frame for the particular channel until after the commercial break.

6. The method of claim 1, wherein capturing comprises automatically capturing at least one video frame for a particular channel in response to detecting a tag that was previously embedded within the broadcast on that channel.

7. The method of claim 1, wherein capturing comprises asynchronously capturing at least two video frames from different channels in response to tags being embedded within the respective broadcasts at different times.

8. The method of claim 1, capturing comprises:
   receiving a schedule for capturing a video frame for a particular channel; and
   capturing the video frame for the channel at a time specified in the schedule.

9. The method of claim 1, wherein the video frames for a plurality of entertainment systems are centrally captured within a broadcast center, the method further comprising:
   packaging the individual captured video frames within an update package; and
   transmitting the update package to at least one entertainment system associated with the broadcast center, the update package being separate from the broadcasts on the plurality of channels.

10. The method of claim 9, wherein capturing comprises successively tuning to each of the plurality of channels using a plurality of tuners.

11. The method of claim 1, wherein the video frames are captured within en entertainment system.

12. The method of claim 11, wherein the entertainment system comprises a primary tuner and a secondary tuner, and wherein capturing comprises successively tuning to each of the plurality of channels using the secondary tuner.

13. The method of claim 1, wherein the single initiating action comprises holding down a first button on a remote control.

14. The method of claim 13, wherein the single terminating action comprises releasing the first button.

15. The method of claim 1, further comprising:
   tuning to and displaying the selected channel in response to a selection action by the user that is separate from the initiating and terminating actions.

16. The method of claim 1, further comprising:
   associating at least one captured video frame with a card object for representing a channel.

17. The method of claim 1, wherein advancing through the captured video frames comprises advancing through at least a subset of the captured video frames.

18. The method of claim 1, wherein the single initiating action comprises activating a first control on the remote control, and wherein the single terminating action comprises activating a second control on the remote control.

19. The method of claim 1, wherein the single initiating action comprises activating a first control on the remote control, and wherein the single terminating action comprises re-activating the first control.

20. A method for enabling access to a plurality of channels within a user interface, the method comprising:
   capturing a video frame from a respective broadcast on each of a plurality of channels, each captured video frame representing a different channel;
   displaying a plurality of icons representing interactive functions along a first axis of the user interface, the icons being scrollable along the first axis to move a selected icon into a single, non-movable focus area within the user interface;
   organizing the captured video frames into a sequence;
   in response to a particular icon representing a television function being scrolled into the focus area, displaying at least a subset of the sequence of video frames along a second, perpendicular axis of the a user interface, one video frame being displayable within the focus area;

scrolling the video frames along the second axis one at a time through the focus area to progressively change the video frame within the focus area to a next video frame in the sequence in response to a single initiating action by a user, the scrolling of video frames automatically proceeding until being terminated by the user; and discontinuing the scrolling of video frames to show a particular video frame within the focus area corresponding to a selected channel in response to a single terminating action by the user.

21. The method of claim 20, further comprising:
repeating the capturing of video frames for the plurality of channels after an established time interval.

22. The method of claim 20, further comprising:
in response to automatically detecting a commercial break being broadcast on a particular channel,
automatically delaying the capture of a video frame for the particular channel until after the commercial break.

23. The method of claim 20, wherein the video frames for a plurality of entertainment systems are centrally captured within a broadcast center, the method further comprising:
packaging the individual captured video frames within an update package; and
transmitting the update package to at least one entertainment system associated with the broadcast center, the update package being separate from the broadcasts on the plurality of channels.

24. A system for enabling access to a plurality of channels within a user interface, the system comprising:
a frame capture device to capture a video frame from a respective broadcast on each of a plurality of channels, each channel to be represented within the user interface by a single captured video frame; and
a transmission component to provide the captured video frames to a display interface, wherein the display interface is to scroll a linear sequence of the captured video frames representing different channels, one video frame at a time, through a single, non-moving focus area within the user interface in response to a single initiating action by a user, wherein the scrolling of video frames automatically proceeds until being terminated by the user, and wherein the display interface is to discontinue the advancing of video frames to show a particular video frame corresponding to a selected channel in response to a single terminating action by the user.

25. The system of claim 24, wherein the frame capture device is to repeat the capture of video frames for the plurality of channels after an established time interval.

26. The system of claim 25, wherein an interval comprises a half hour.

27. The system of claim 25, wherein an interval comprises an hour.

28. The system of claim 24, wherein the frame capture device is to automatically detect a commercial break being broadcast on a particular channel and automatically delay the capture of a video frame for the particular channel until after the commercial break in response to the commercial being detected.

29. The system of claim 24, wherein the frame capture device is to automatically capture at least one video frame for a particular channel in response to detecting a tag that was previously embedded within the broadcast on that channel.

30. The system of claim 24, wherein the frame capture device is to asynchronously capture at least two video frames from different channels in response to tags being embedded within the respective broadcasts at different times.

31. The system of claim 24, wherein the frame capture device is to receive a schedule for capturing a video frame for a particular channel and wherein the frame capture device is to capture the video frame for the channel at a time specified in the schedule.

32. The system of claim 24, wherein the frame capture device and transmission components are components of a broadcast center that centrally captures the video frames for a plurality of entertainment systems, and wherein the transmission component comprises:
an image cache to store the captured video frames; and
a packaging component to package the individual captured video frames in the image cache into an update package and to transmit the update package to at least one entertainment system associated with the broadcast center, the update package being separate from the broadcasts on the plurality of channels.

33. The system of claim 32, further comprising:
a plurality of tuners to successively tune to each of the plurality of channels during the capture of the video frames.

34. The system of claim 24, wherein the frame capture device and transmission component are components of an entertainment system of a user, and wherein the transmission component comprises:
an image cache to store the captured video frames.

35. The system of claim 34, further comprising;
a primary tuner and a secondary tuner, wherein the secondary tuner is to successively tune to each of the plurality of channels during capture of the video frames.

36. The system of claim 24, wherein the single initiating action comprises activating a first control on a remote control.

37. The system of claim 36, wherein the single terminating action is at least one of activating a second control on the remote control, releasing the first control, and re-activating the first control.

38. The system of claim 24, further comprising a tuner for tuning to the selected channel in response to a selection action by the user.

39. The system of claim 24, further comprising a computer-readable medium for associating at least one captured video frame with a card object for representing a channel.

40. The system of claim 24, wherein the display interface is to advance through at least a subset of the video frames.

41. A system for enabling access to a plurality of channels within a user interface, the system comprising:
a frame capture device to capture a video frame from a respective broadcast on each of a plurality of channels, each captured video frame representing a different channel; and
a transmission component to provide the captured video frames to a display interface, wherein the display interface is to display a plurality of icons representing interactive functions along a first axis of the user interface, the icons being scrollable along the first axis to move a selected icon into a single, non-movable focus area within the user interface, wherein the display interface is further to organize the captured video frames into a sequence and display, in response to a particular icon being scrolled into the focus area, at least a subset of the sequence of video frames along second, perpendicular axis of a user interface, a single video frame in the sequence being displayable within the focus area of the user interface, and wherein the display interface is further to scroll the video frames along the second axis one at a time through the focus area to progressively change the video frame within the focus area to a next video frame in the sequence in response to a single initiating action by a user, the scrolling of video frames automatically proceeding until being terminated by the user, and discontinue the scrolling of video frames to show a particular video frame within the focus area corresponding to a selected channel in response to a single terminating action by the user.

42. The system of claim 41, wherein the frame capture device is to repeat the capturing of a video frame for each of the plurality of channels at established time intervals.

43. The method of claim 41, wherein the frame capture device is to automatically detect a commercial break being broadcast on a particular channel and automatically delay the capture of a video frame for the particular channel until after the commercial break in response to the commercial break being detected.

44. The method of claim 41, wherein the frame capture device and transmission component are components of a broadcast center that centrally captures video frames for a plurality of entertainment systems, and wherein the transmission component comprises a packaging component to package the individual captured video frames within an update package and to transmit the update package to at least one entertainment system associated with the broadcast center, the update package being separate from the broadcasts on the plurality of channels.

45. A system within a broadcast center for centrally capturing video frames to enable access to a plurality of channels within respective user interfaces of a plurality of entertainment systems, the system comprising:
  a scheduler to initiate the capture of a video frame from a broadcast on each of a plurality of channels, each captured video frame representing a different channel;
  a tuner to tune to each channel in response to a signal from the scheduler;
  a frame capture device to capture each video frame in response to the tuner tuning to the respective channel;
  an image cache to store the captured video frames; and
  a transmission component to transmit the captured video frames in the image cache to the plurality of entertainment systems, the captured video frames being sent separately from the broadcasts, wherein each entertainment system comprises a display interface to scroll through at least a subset of the captured video frames through a single, non-movable focus area of the user interface in response to a single initiating action by a user, wherein the scrolling of video frames automatically proceeds until being terminated by the user, and wherein the display interface is to discontinue the cycling of video frames to show a particular video frame corresponding to a selected channel in response to a single terminating action by the user.

46. The system of claim 45, wherein the scheduler is to periodically initiate the capture of video frames at an established time interval.

47. The system of claim 45, wherein the display interface is to cycle through at least a subset of the video frames.

48. A system for enabling access to a plurality of channels within a user interface, the system comprising:
  means for capturing a video frame from a respective broadcast on each of a plurality of channels, each channel to be represented within the user interface by a single captured video frame;
  means for scrolling a linear sequence of at least a subset of the captured video frames one at a time through a non-moving focus area of a user interface in response to a single initiating action by a user, the scrolling of video frames automatically proceeding until being terminated by the user; and
  means for discontinuing the advancing of video frames to show a particular video frame corresponding to a selected channel in response to a single terminating action by the user.

49. A system for enabling access to a plurality of channels within a user interface, the system comprising:
  means for capturing a video frame from a respective broadcast on each of a plurality of channels, each captured video frame representing a different channel;
  means for displaying a plurality of icons representing interactive functions along a first axis of the user interface, the icons being scrollable along the first axis to move a selected icon into a single, non-movable focus area within the user interface;
  means for organizing the captured video frames into a sequence;
  means for displaying, in response to a particular icon representing a television function being scrolled into the focus area, at least a subset of the sequence of video frames along second, perpendicular axis of the user interface, one video frame being displayable within the focus area;
  means for scrolling the video frames one at a time through the focus area along the second axis to progressively change the video frame within the focus area to a next video frame in the sequence in response to a single initiating action by a user, the scrolling of video frames automatically proceeding until being terminated by the user, and
  means for discontinuing the scrolling of video frames to show a particular video frame within the focus area corresponding to a selected channel in response to a single terminating action by the user.

50. An article of manufacture comprising a computer-accessible medium including program code for causing a computer to perform a method for enabling access to a plurality of channels within a user interface, the method comprising:
  capturing a video frame from a respective broadcast on each of a plurality of channels, each channel to be represented within the user interface by a single captured video frame;
  scrolling a linear sequence of the captured video frames representing different channels through a single, non-moving focus area of a user interface in response to a single initiating action by a user, the scrolling of video frames automatically proceeding until being terminated by the user; and
  discontinuing the scrolling display of video frames to show a particular video frame corresponding to a selected channel in response to a single terminating action by the user.

51. An article of manufacture comprising a computer-accessible medium including program code for causing a computer to perform a method for enabling access to a plurality of channels within a user interface, the method comprising:

capturing a video frame from a respective broadcast on each of a plurality of channels, each captured video frame representing a different channel;

displaying a plurality of icons representing interactive functions along a first axis of the user interface, the icons being scrollable along the first axis to move a selected icon into a single, non-movable focus area within the user interface;

organizing the captured video frames into a sequence; in response to a particular icon representing a television function being scrolled into the focus area, displaying at least a subset of the sequence of video frames along second, perpendicular axis of the user interface, one video frame being displayable within the focus area;

scrolling the video frames one at a time through the focus area along the second axis to progressively change the video frame within the focus area to a next video frame in the sequence in response to a user holding down a button on a remote control device, the scrolling of video frames automatically proceeding until being terminated by the user; and discontinuing the scrolling of video frames to show a particular video frame within the focus area corresponding to a selected channel in response to the user releasing the button on the remote control device.

52. A method for enabling access to a plurality of channels within a user interface, the method comprising:

capturing, within a broadcast center, a video frame from a respective broadcast on each of a plurality of channels, each captured video frame representing a different channel;

transmitting an update package comprising the captured video frames to each of a plurality of an interactive television system serviced by the broadcast center, the update package being separate from the broadcasts on the plurality of channels;

within each interactive television system receiving the update package, advancing the captured video frames one at a time through a single, non-moving focus area of a user interface in response to a single initiating action by a user, the advancing of video frames automatically proceeding until being terminated by the user, and discontinuing the advancing of video frames to show a particular video frame corresponding to a selected channel in response to a single terminating action by the user.

* * * * *

UNITED STATES PATENT AND TRADEMARK OFFICE
CERTIFICATE OF CORRECTION

PATENT NO.         : 7,080,394 B2                                          Page 1 of 1
APPLICATION NO. : 10/230964
DATED               : July 18, 2006
INVENTOR(S)       : Anthony F. Istvan et al.

It is certified that error appears in the above-identified patent and that said Letters Patent is hereby corrected as shown below:

Column 2, line 13, "... FIG. 2. is an illustration ..." change to --FIG. 2 is an illustration--

Column 14, line 5, "... claim 1, capturing ..." change to --claim 1, wherein capturing--

Column 14, line 23, "... within en entertainment ..." change to --within an entertainment--

Column 14, line 66, "... axis of the a user interface, ..." change to --axis of the user interface--

Column 16, line 30, "... claim 34, further comprising;" change to --claim 34, further comprising:--

Column 18, line 29, "... along second, perpendicular axis ..." change to --along a second, perpendicular axis--

Column 18, line 38, "... user, and" change to --user; and--

Column 19, lines 12-13, "... frames along second, perpendicular axis ..." change to --frames along a second, perpendicular axis--

Signed and Sealed this

Thirtieth Day of January, 2007

JON W. DUDAS
*Director of the United States Patent and Trademark Office*